(12) United States Patent
Hoenig et al.

(10) Patent No.: US 8,016,993 B2
(45) Date of Patent: Sep. 13, 2011

(54) ELECTROSTATIC DESALINATION AND WATER PURIFICATION

(76) Inventors: Stuart Alfred Hoenig, Tucson, AZ (US); Magdi Emil Abdel Malak, Vancouver (CA)

( * ) Notice: Subject to any disclaimer, the term of this patent is extended or adjusted under 35 U.S.C. 154(b) by 194 days.

(21) Appl. No.: 12/403,435

(22) Filed: Mar. 13, 2009

(65) Prior Publication Data

US 2009/0230039 A1  Sep. 17, 2009

Related U.S. Application Data

(60) Provisional application No. 61/036,912, filed on Mar. 14, 2008.

(51) Int. Cl.
*C02F 1/46* (2006.01)

(52) U.S. Cl. ........................................ 204/518; 204/265

(58) Field of Classification Search ................. 204/518, 204/265
See application file for complete search history.

(56) References Cited

U.S. PATENT DOCUMENTS 5,203,993 A  4/1993  Arbisi
5,817,224 A *  10/1998  Pitts, Jr. ........................ 204/571

* cited by examiner

*Primary Examiner* — Arun S Phasge
(74) *Attorney, Agent, or Firm* — Patent Technologies, LLC; Robert D. Gunderman, Jr.

(57) ABSTRACT

An apparatus, system and method for desalination and purification of water where fresh water is extracted from salt water, leaving behind the higher salinity salt water. Salt water is bubbled, aerated, sprayed, or otherwise agitated to cause breaking bubbles along the surface of the salt water. An electric field is applied above the surface of the salt water; fresh water droplets and vapor are released in the process of bubble rupture, pulled away from the surface of the salt water, and collected for consumption. The present invention may also be used to purify fresh water by leaving impurities behind.

16 Claims, 8 Drawing Sheets

ELECTROSTATIC DESALINATION AND WATER PURIFICATION

This application claims priority to U.S. patent application Ser. No. 61/036,912 filed Mar. 14, 2008 entitled "Electrostatic Desalination And Water Purification" by Dr. Stuart Alfred Hoenig of Tucson, Ariz.

BACKGROUND OF THE INVENTION

1. Field of the Invention

This invention relates generally to fresh water production, and more particularly to an apparatus, system and method for electrostatic desalination and water purification.

2. Description of Related Art

One of the growing problems facing mankind in the $21^{st}$ century is the ability of the earth to sustain an ever growing population. Natural resources such as food and water supplies are being depleted or damaged by the activities of man in ways that impact all of humanity, particularly those that live in poor regions of the world.

Clean drinking water is essential for all life to exist on this planet. In addition, water is necessary to grow crops and sustain food production. Unfortunately our fresh water resources have not been protected in ways that will ensure that future generations will have adequate fresh water supplies. Fresh water has been overused, aquifers have been depleted, and pollution has spoiled water quality in many regions of the world. Fresh water supplies were treated as a never ending resource; unfortunately, this is not reality, and water shortages as well as the spread of disease and sickness through contaminated water is a major problem of this century. Technical advances are needed to provide adequate water supplies to sustain life in the future. These advances may include techniques to clean polluted water as well as techniques to utilize the earth's available water in ways that have heretofore been impossible.

According to the NASA Earth Observatory website www.earthobservatory.nasa.gov, 75 percent of the earth's surface is covered by water, with 96.5 percent being in the global oceans. Unfortunately, ocean water is not drinkable in its present form. This has been a monumental difficulty throughout humanity, and the frustration of having plentiful, albeit non-drinkable, water is described well in the famous line from Samuel Taylor Coleridge's The Rime of the Ancient Mariner—"Water, water, everywhere Nor any drop to drink".

There are techniques to extract fresh water from salt water, one of the oldest being boiling or distillation. As salt water is boiled, the steam leaving the salt water is condensed, the steam being essentially fresh water. This technique was known by mariners hundreds of years ago, and still manifests itself in commercial flash distillation plants. Distillation is an energy intensive process due to the heat required. This makes distillation not only expensive, but also contributes to the growing problem of carbon dioxide emissions, as well as other pollutants, and their subsequent impact on the environment. Reverse Osmosis is a fairly recent technique that has gained widespread attention as an alternative to distillation. This process is also energy intensive due to the pressures needed to move water through the reverse osmosis membrane.

There have been other attempts to desalinate ocean water including freezing, various chemical processes, and others.

In the 1960's, Yukichi Asakawa observed that the evaporation of water can be increased or assisted by an electric field. In a 1967 symposium this information was presented to the Japan Society of Mechanical Engineering.

In U.S. Pat. No. 5,203,993 Method and Apparatus For Removing Salt From Sea Water, now expired, Arbisi describes an apparatus and method that used a supply tank containing salt water where bubbles are discharged in the chamber and a crossflow of air is applied along with an electric field to obtain water of lesser salinity than the starting salt water. In the '993 patent, techniques to further reduce the salinity of the product water are disclosed, including reverse osmosis and electrodialysis desalination. It appears from the disclosure that the apparatus of Arbisi was not able to generate fresh water without the addition of a secondary system such as reverse osmosis or electrodialysis desalination. In addition, the apparatus of Arbisi uses supply tanks and collection tanks, making the apparatus unsuitable for continuous processing of fresh water. These and other shortcomings are solved by the present invention and the various embodiments described herein. The entire disclosure of U.S. Pat. No. 5,203,993 is incorporated herein by reference.

It is known that an electric field is capable of interacting with water vapor. U.S. Pat. No. 6,302,944 to Hoenig describes an Apparatus For Extracting Water Vapor From Air. The entire disclosure of this patent is incorporated herein by reference.

Therefore, there currently exists an unmet need for a system to remove impurities from sea water to make it fit for human consumption without the need for massive energy consumption and its associated pollution, carbon emissions, and other environmental impacts. It is expected that this unmet need will continue to increase with the rise in world populations and the increase in global temperatures and associated water shortages. There is further an unmet need to provide a system to convert sea water into fresh water that can be economically scaled in size to provide both small systems that can be economically operated in poor regions of the world as well as larger commercial systems that can supply fresh water on a municipal or regional basis. It is thus an object of the present invention to provide an apparatus, system and method for desalination and purification of water, in particular but not limited to, the desalination of sea water. It is another object of the present invention to provide an apparatus, system and method for desalination and purification of water that requires very little energy consumption. It is yet another object of the present invention to provide an apparatus, system and method for desalination and purification of water that has very low maintenance requirements and is simple to operate. It is yet another object of the present invention to provide an apparatus, system and method for desalination and purification of water that operates on either a continuous or a batch process. These and other objects of the present invention will be further brought to light upon reading this specification and claims and viewing the attached drawings.

BRIEF SUMMARY OF THE INVENTION

In accordance with the present invention, there is provided an apparatus, system and method for desalination that uses bubbling, agitation and aeration of salt water to create fresh water droplets and vapor that are electrostatically collected and processed for subsequent consumption. The present invention may also be used to purify fresh water by leaving impurities behind.

The foregoing paragraph has been provided by way of introduction, and is not intended to limit the scope of the invention as described by this specification, drawings and claims.

BRIEF DESCRIPTION OF THE DRAWINGS

The invention will be described by reference to the following drawings, in which like numerals refer to like elements, and in which.

Figure 1:
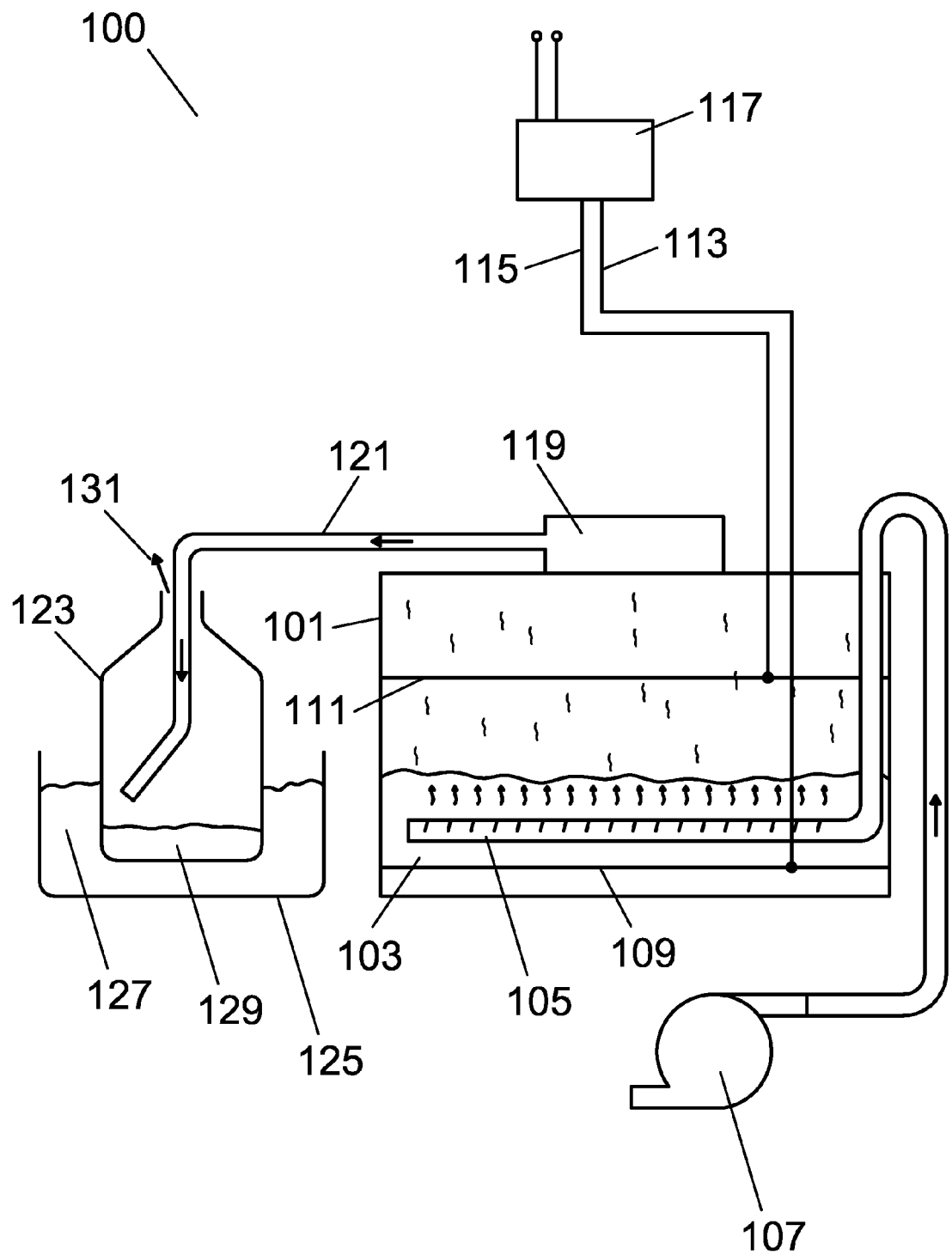
FIG. 1 is a diagram of one embodiment of the present invention.

The present invention will be described in connection with several preferred embodiments, however, it will be understood that there is no intent to limit the invention to the embodiments described. On the contrary, the intent is to cover all alternatives, modifications, and equivalents as may be included within the spirit and scope of the invention as defined by this specification, drawings and claims.

DESCRIPTION OF THE PREFERRED EMBODIMENTS

For a general understanding of the present invention, reference is made to the drawings. In the drawings, like reference numerals have been used throughout to designate identical elements.

A brief overview of several basic physical concepts is presented here to fully enable one skilled in the art to make and use the invention.

In nature, there are processes that occur in the water cycle where fresh water leaves the surface of the oceans and is transferred into the atmosphere, consequently formed as clouds, and then redeposited into the oceans. This water cycle is presented in overly simplified terms, but there are many subtleties of the water cycle that are not fully understood, but have been explored over the years. In the 1950's, Woods Hole Oceanographic Institution performed extensive research into the interaction between the oceans, the earth's fields, and weather phenomenon. For example. Duncan C. Blanchard, in the August 1958 issue of The Journal of Meteorology, in a manuscript entitled "Electrically Charged Drops From Bubbles In Sea Water And Their Meteorological Significance", describes bubbles formed at sea, resulting jet droplets that are released from the bubble as it breaks the surface of the sea, and resulting electric charges that are formed on the released jet droplets. When a bubble breaks the surface of water, it ejects several small droplets that will then fall back into the water through loss of kinetic energy and the resulting force of gravity exerted thereon. These droplets may be jet droplets, or droplets may also form on the periphery of larger bubbles as they break the surface of the water, and are at times referred to as film droplets, as they result from the bursting of the "film" of the bubble as it breaks the surface of the water. The phenomenon of electric charge at the boundary condition of an air water interface is most peculiar, and has been noted several times in the history of scientific research. It was noted almost 150 years ago that the boundary condition of water droplets releasing from a nozzle into the air can create electrostatic forces. In a paper delivered to the Royal Society of London on Jun. 19, 1867, and entitled "On a Self-acting Apparatus for multiplying and maintaining electric charges", Sir W. Thomson (Lord Kelvin) describes in further detail the water-dropping collector for atmospheric electricity that he disclosed during a lecture at the Royal Institution in 1860. The disclosure of this paper may be obtained from the Royal Society of London, and is incorporated herein in its entirety. The Kelvin Dropper, as it has become known, has been displayed over the years as a scientific curiosity. It is a most amazing device, where two streams of water run down into two metallic reservoirs that are electrically isolated from one another. The water passes through two metallic rings or cylinders, electrically connected to the opposite metallic reservoir. If the electrical connections are placed in proximity to each other, and are non-insulated, a spark will jump the gap between them. This phenomenon will repeat itself periodically. The spark will easily jump a 1 cm. gap between the electrical connections, meaning that the electric field generated by such a simple device is in excess of 22.3 KV/cm (an approximate breakdown electric field in air). The Kelvin Dropper brings to mind many questions and it can only be speculated that the boundary conditions of droplets entering the air and the resulting electric charge is similar to the processes by which bubbles breaking the surface of water create an electric charge.

The boundary conditions of a bubble breaking the surface of water creates an electric charge. Blanchard proved this in his 1958 manuscript entitled "Electrically Charged Drops From Bubbles In Sea Water And Their Meteorological Significance". In salt water, this electric charge and possibly other phenomenon result in the ejected water droplets being essentially fresh water. The applicants, while providing a brief overview of the phenomenon, do not wish to be bound to any particular theory as to why the electric charge occurs or why fresh water is produced from salt water, but rather, wish to harness this phenomenon in new and useful ways.

Turning now to FIG. 1, a diagram of one embodiment of the present invention is depicted. The embodiment depicted in FIG. 1 was built and tested, and the results are provided herein.

A salt water reservoir 101 is depicted. In the experimental setup, a ten gallon glass aquarium was used, but in practice, any suitable vessel for holding salt water and the associated bubbler and upper electrode assembly will do. The salt water 103 is added to the salt water reservoir 101 to a level at which the salt water vessel is partially filled. In the case of the experimental setup, the salt water used was pacific ocean salt water purchased from Petco. Other natural salt water or brackish water would work with equally satisfactory results. Within the salt water reservoir 101 is a bubbler 105. The bubbler 105 is connected to an air source 107 such as a blower, compressor or the like. The experimental setup used a bubbler made from a serpentine arrangement of ½ inch PVC pipe with slits scored on the upper surface using a scroll saw. Other structures that emanate bubbles in water may also be used. In addition, other techniques for aerating the water, such as electrostatic devices, piezoelectric motors and drives, and the like, may also be used. The air source 107 in the experimental setup was both a small air compressor, as well as a vacuum unit operated as a blower. Other sources of air may also be used. In the salt water 103, a water ground 109 is present. The ground 109 may be any conductive material. By way of example, the experimental setup used ½ inch stainless steel grid cloth as provided by McNichols Corporation. The ground 109 is connected to a high voltage power supply 117 such as the one used in the experimental setup manufactured by Emco High Voltage. Inc. The connection is made by a ground lead 113 that may be any suitable conductor such as 18 gauge insulated copper wire. Sitting above the salt water 103 is an upper electrode 111 that is connected to the high voltage power supply 117 by way of an upper electrode lead 115. The upper electrode lead may be, for example, 18 gauge insulated copper wire. The insulation is preferably of the kind made for high voltage applications and contains, for example, silicone. The upper electrode 111 may be made from any suitable metallic structure. By way of example, the experimental setup used ½ inch stainless steel grid cloth as provided by McNichols Corporation. The salt water reservoir 101 in one embodiment is covered with a blower 119 to extract and remove fresh water droplets from the reservoir 101. The blower 119 is attached to a fresh water outlet 121 that enters a condensing vessel 123. The condensing vessel in the experimental setup, by way of example, was a 5 gallon glass carboy. The condensing vessel 123 is cooled using any suitable technique for reducing the temperature of a structure. In the experimental setup, a cooling vessel 125 which was a plastic tub containing a coolant 127, in this case snow, was used. Other techniques, such as coolant liquid, cooling airflow, condenser technologies, or the like, may also be used. Fresh water 129 is thus collected in the condensing vessel 123. Exhaust air 131 exits the system during operation.

It should be noted that in place of a condensing vessel 123 and related structures, an electrostatic device such as the Apparatus For Extracting Water Vapor From Air that is disclosed in U.S. Pat. No. 6,302,944 to Hoenig, may be used to collect the fresh water.

To use the embodiment of the present invention depicted in FIG. 1, salt water 103 is placed in the salt water reservoir 101. Care should be taken not to splash the salt water on the sides of the salt water reservoir 101. The high voltage supply 117 is turned on, and the blower 107 is turned on. As bubbles travel through the salt water by way of the blower 119, they burst upon arrival at the surface of the salt water. They release fresh water droplets through the process described previously. The fresh water droplets then encounter the electric field as provided by the upper electrode 111, and are pulled upward and through the upper electrode 111, where they encounter outward air movement provided by the blower 119. The fresh water droplets are then conveyed through a fresh water outlet 121 and into a condensing vessel 123 where they condense and coalesce into fresh water.

In a series of experiments performed at the Lennox Tech Center, Rochester, N.Y. the experimental setup of FIG. 1 was operated for 30 minutes in two separate experiments. The applied voltage was −5,200 volts. The total dissolved solids in parts per million as well as the pH were measured using an Omega Instruments pH/Conductivity meter. The sea water was pacific ocean sea water purchased from Petco. In the first experimental run, the sea water was at 29,400 ppm with a pH of 8.19. After 30 minutes, 25 ml. of fresh water was produced with a pH of 7.18 at 590 ppm. The experiment was repeated with no voltage applied, and 8 ml. of fresh water was produced with a pH of 7.05 at 650 ppm. A second experiment repeated this test with the same setup as before. The sea water was at 30,900 ppm with a pH of 8.3. After 30 minutes, 25 ml. of fresh water was produced with a pH of 6.4 at 580 ppm. The experiment was repeated with no voltage applied, and 2 ml. of fresh water was produced in 46 minutes.

Figure 2:
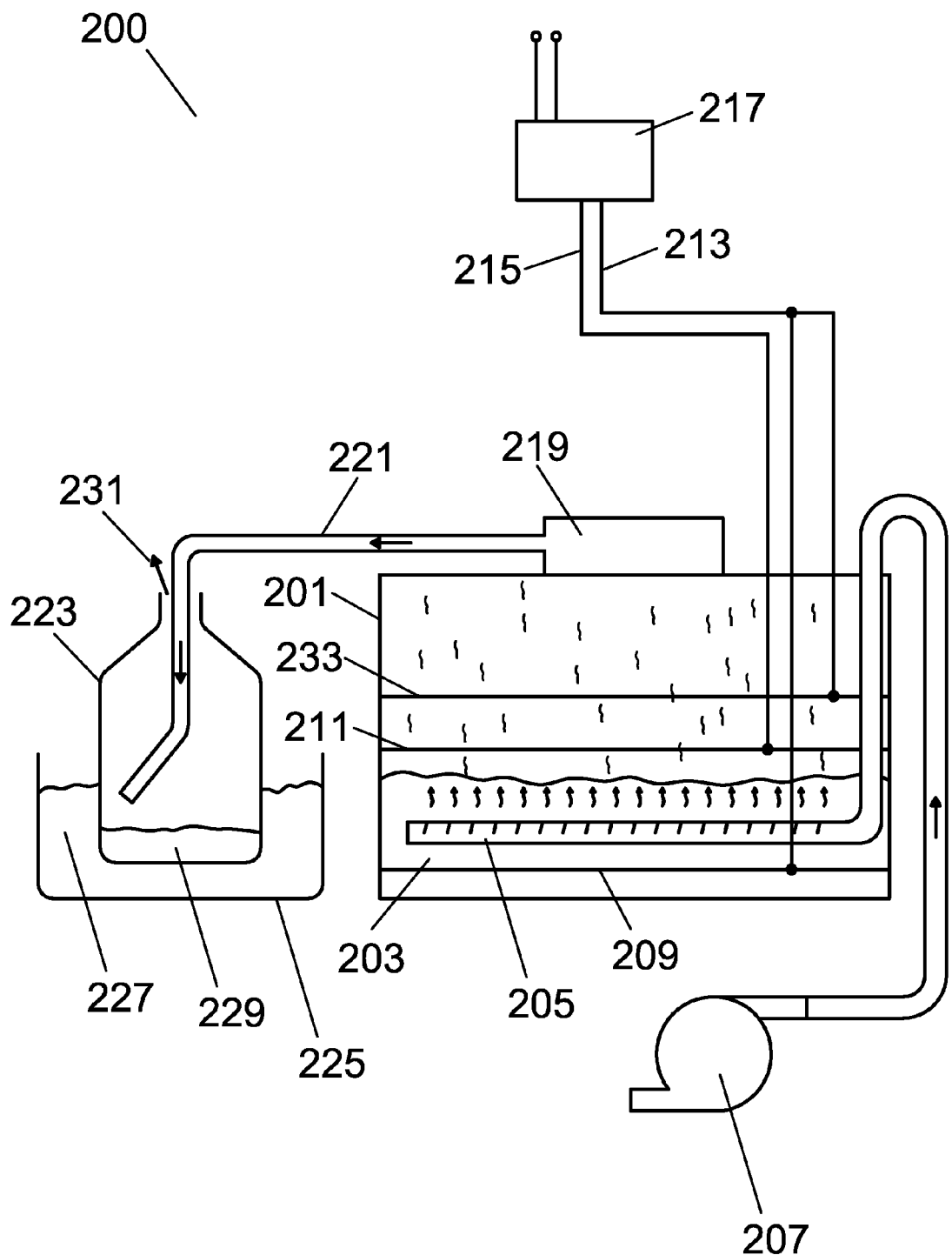
FIG. 2 is a diagram of an alternative embodiment of the present invention.

Turning now to FIG. 2 and the setup depicted therein, a diagram of an alternative embodiment of the present invention is depicted. The setup is very similar to the setup previously described in FIG. 1, with the addition of an upper ground 233. The upper ground 233 may be any conductive material, and is positioned above the upper electrode 211. One example of a suitable material for the upper ground 233 is ½ inch stainless steel grid cloth as provided by McNichols Corporation.

A salt water reservoir 201 is depicted. Any suitable vessel for holding salt water and the associated bubbler and upper electrode assembly will do. The salt water 203 is added to the salt water reservoir 201 to a level at which the salt water vessel is partially filled. Within the salt water reservoir 201 is a bubbler 205. The bubbler 205 is connected to an air source 207 such as a blower, compressor or the like. Suitable bubblers include, for example, PVC pipe that is perforated, sintered metals, sintered ceramics, and the like. Air sources 207 may include compressors, blowers, and the like. In the salt water 203, a water ground 209 is present. The water ground 209 may be any conductive material, such as, for example, ½ inch stainless steel grid cloth as provided by McNichols Corporation. The water ground 209 is connected to a high voltage power supply 217 such as, for example, the high voltage power supplies manufactured by Emco High Voltage, Inc. The connection is made by a ground lead 213 that may be any suitable conductor such as 18 gauge insulated copper wire. Sitting above the salt water 203 is an upper electrode 211 that is connected to the high voltage power supply 217 by way of an upper electrode lead 215. The upper electrode lead may be, for example, 18 gauge insulated copper wire. The insulation is preferably of the kind made for high voltage applications and contains, for example, silicone. The upper electrode 211 may be made from any suitable metallic structure such as, for example, ½ inch stainless steel grid cloth as provided by McNichols Corporation. Above the upper electrode 211 is an upper ground 233 that may be made from any suitable metallic structure such as, for example, ½ inch stainless steel grid cloth as provided by McNichols Corporation. The salt water reservoir 201 in one embodiment is covered with a blower 219 to extract and remove fresh water droplets from the reservoir 201. The blower 219 is attached to a fresh water outlet 221 that enters a condensing vessel 223, that may be any suitable vessel for collecting and retaining fresh water, and may be made from, for example, glass, metal, a plastic, or the like. The condensing vessel 223 is cooled using any suitable technique for reducing the temperature of a structure, such as a plastic tub 225 containing a coolant 227. Other techniques, such as coolant liquid, cooling airflow, condenser technologies, or the like, may also be used. Fresh water 229 is thus collected in the condensing vessel 223. Exhaust air 231 exits the system during operation.

It should be noted that in place of a condensing vessel 223 and related structures, an electrostatic device such as the Apparatus For Extracting Water Vapor From Air that is disclosed in U.S. Pat. No. 6,302,944 to Hoenig, may be used to collect the fresh water.

To use the embodiment of the present invention depicted in FIG. 2, salt water 203 is placed in the salt water reservoir 201. Care should be taken not to splash the salt water on the sides of the salt water reservoir 201. The high voltage supply 217 is turned on, and the blower 207 is turned on. As bubbles travel through the salt water by way of the blower 219, they burst upon arrival at the surface of the salt water. They release fresh water droplets through the process described previously. The fresh water droplets then encounter the electric field as provided by the upper electrode 211, and are pulled upward and through the upper electrode 211 and the upper ground 211, where they encounter outward air movement provided by the blower 219. The fresh water droplets are then conveyed through a fresh water outlet 221 and into a condensing vessel 223 where they condense and coalesce into fresh water.

Figure 3:
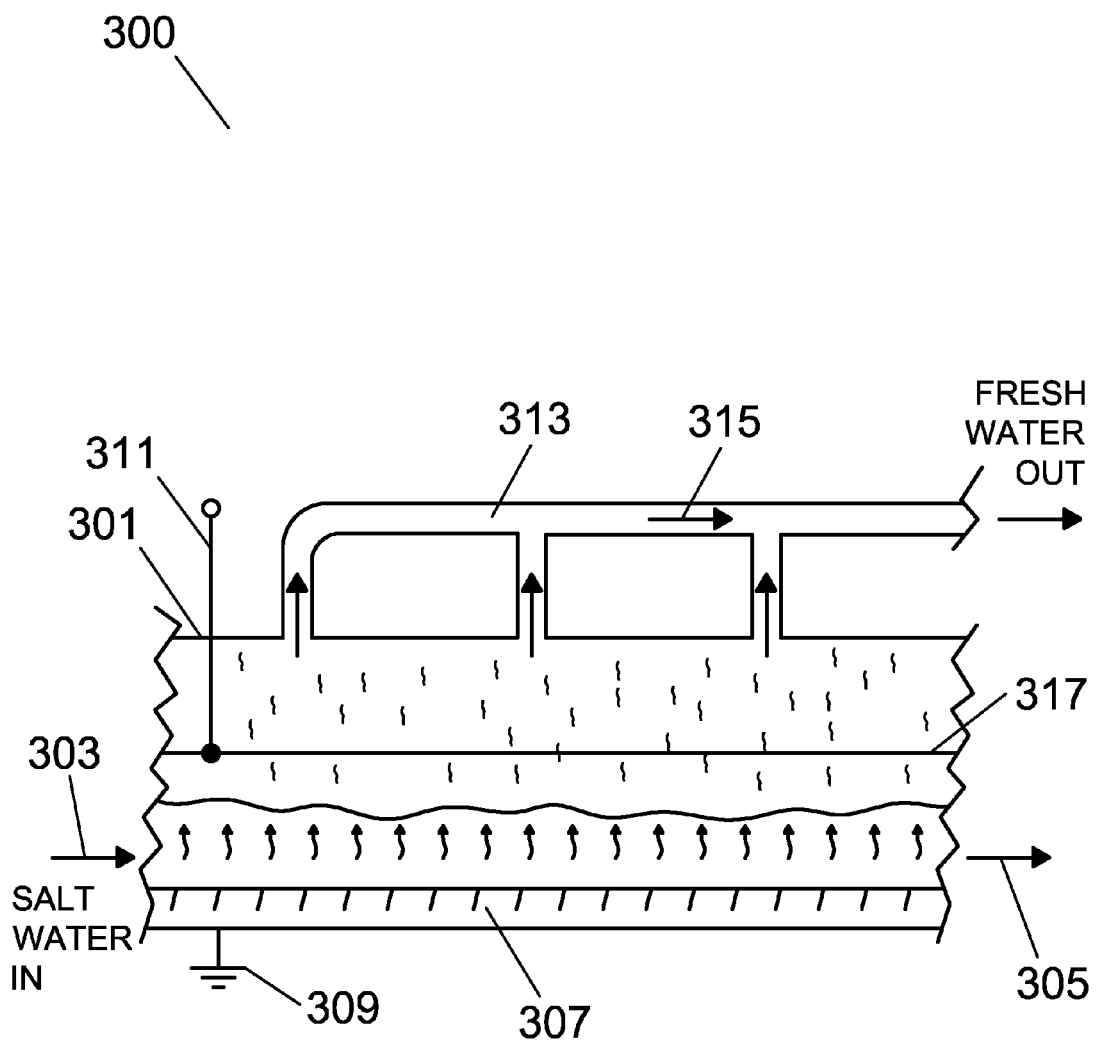
FIG. 3 is a cross sectional view of a continuous flow system of the present invention.

Turning now to FIG. 3, a cross sectional view of a continuous flow system of the present invention is depicted. FIG. 3 should be viewed accompanied by FIG. 4. In order to extract fresh water from salt water, a continuous process is needed to generate quantities of water that are sufficient for use by multiple individuals, businesses, communities, municipalities, regions, and the like. The continuous flow system depicted in FIGS. 3 and 4 moves salt water from an ocean, sea, or another source, and creates a flow whereby the fresh water is extracted as it travels through the continuous flow system. FIG. 3 depicts a cross sectional view of a continuous flow system of the present invention. A flow vessel 301 is depicted that may be made from a metal such as steel, iron, copper, or the like. The flow vessel 301 may also be made from a plastic such as polyvinyl chloride (PVC), Polyethelyne (PE), or the like. As salt water enters the flow vessel 301 as depicted by the flow vector in 303, a level of salt water within the flow vessel is maintained between the upper electrode 317 and the bubbler 307 to allow for proper operation of the system. The level of salt water is maintained through techniques known to those skilled in the art, such as, for example, a pump with a duty cycle or speed control that is controlled by a level sensor or sensors. Salt water then leaves the system to return to the sea or, in some embodiments of the present invention, to be recirculated through the system subsequent times. Toward the bottom of the flow vessel 301, a bubbler 307 is depicted. The bubbler 307 may be made from a pipe that is perforated, a sintered metal, a sintered ceramic, and the like. In addition, other techniques for aerating the water, such as electrostatic devices, piezoelectric motors and drives, and the like, may also be used. The lower part of the flow vessel 301 is grounded such that the salt water in the system is grounded as well. An upper electrode 317 is placed above the salt water in the (low vessel and is retained through structures such as standoffs, fasteners, and the like (not shown). The upper electrode 317 may be made from any suitable conductive material such as stainless steel, copper, or the like. In some embodiments of the present invention, the upper electrode 317 is coated with a dielectric such as, for example, an electrical varnish, an epoxy, or the like. The upper electrode 317 is electrically connected to a high voltage power supply (not shown) by way of an upper electrode lead 311 that may be for example, 18 gauge insulated copper wire. The insulation is preferably of the kind made for high voltage applications and contains, for example, silicone. Coupled to the flow vessel 301 is a fresh water manifold 313 that takes the produced fresh water droplets and vapor and carries them away and into a processing chamber or vessel in the direction of the fresh water flow vector 315. The fresh water flow vector 315 may be mechanically assisted through the actions of a blower, fan, or the like (not shown). In some embodiments of the present invention, the fresh water manifold 313 is cooled to assist in the collection and condensation of fresh water. In other embodiments of the present invention, an electrostatic device such as the Apparatus For Extracting Water Vapor From Air that is disclosed in U.S. Pat. No. 6,302,944 to Hoenig, may be used to collect the fresh water.

Figure 4:
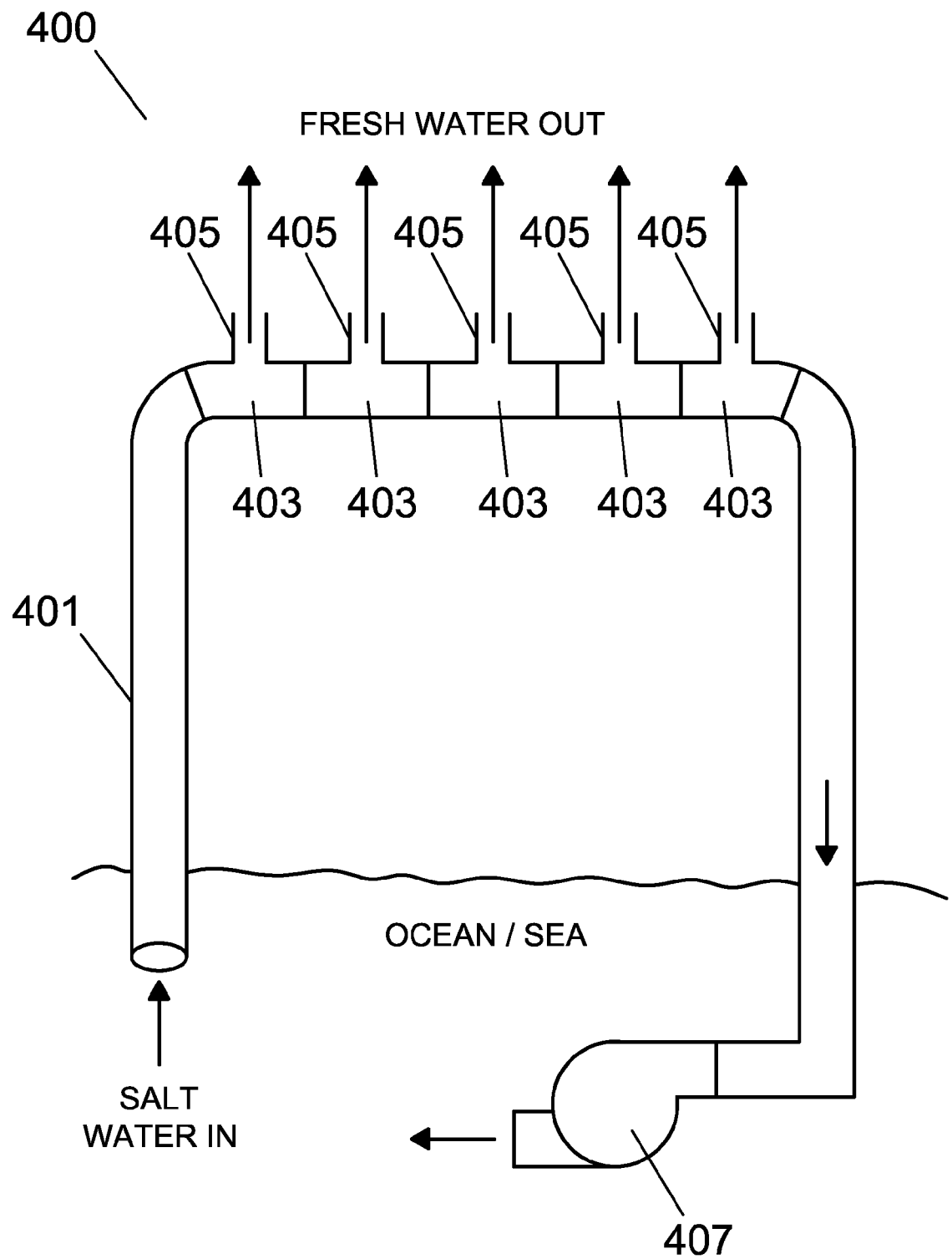
FIG. 4 is a plan view of a continuous How system of the present invention.

The basic building block described in FIG. 3 can be enlarged, or more flow vessels connected in a pipeline like configuration, to increase output and production of fresh water. As depicted in FIG. 4, a plan view of a continuous flow system of the present invention is depicted. Multiple flow vessels 403 that have been described by way of FIG. 3, are connected together, with a fresh water manifold 405 delivering fresh water as has been described by way of FIG. 3. The continuous flow system has an intake 401 for bringing salt water in. A pump or series of pumps are used to circulate the salt water through the system, allowing for the production of fresh water through the process that has been heretofore described.

To use the continuous flow system of the present invention, salt water passes through a flow vessel or a series of flow vessels. As the salt water passes through, bubbles are injected into the salt water. Upon bursting of the bubbles in the salt water, fresh water jet and film droplets are released from the surface of the salt water. These drops are predominantly fresh water, and are electrostatically removed from the immediate environment surrounding the salt water by way of an applied electrostatic field and an airflow. As they are removed, they are collected as fresh water.

Figure 5:
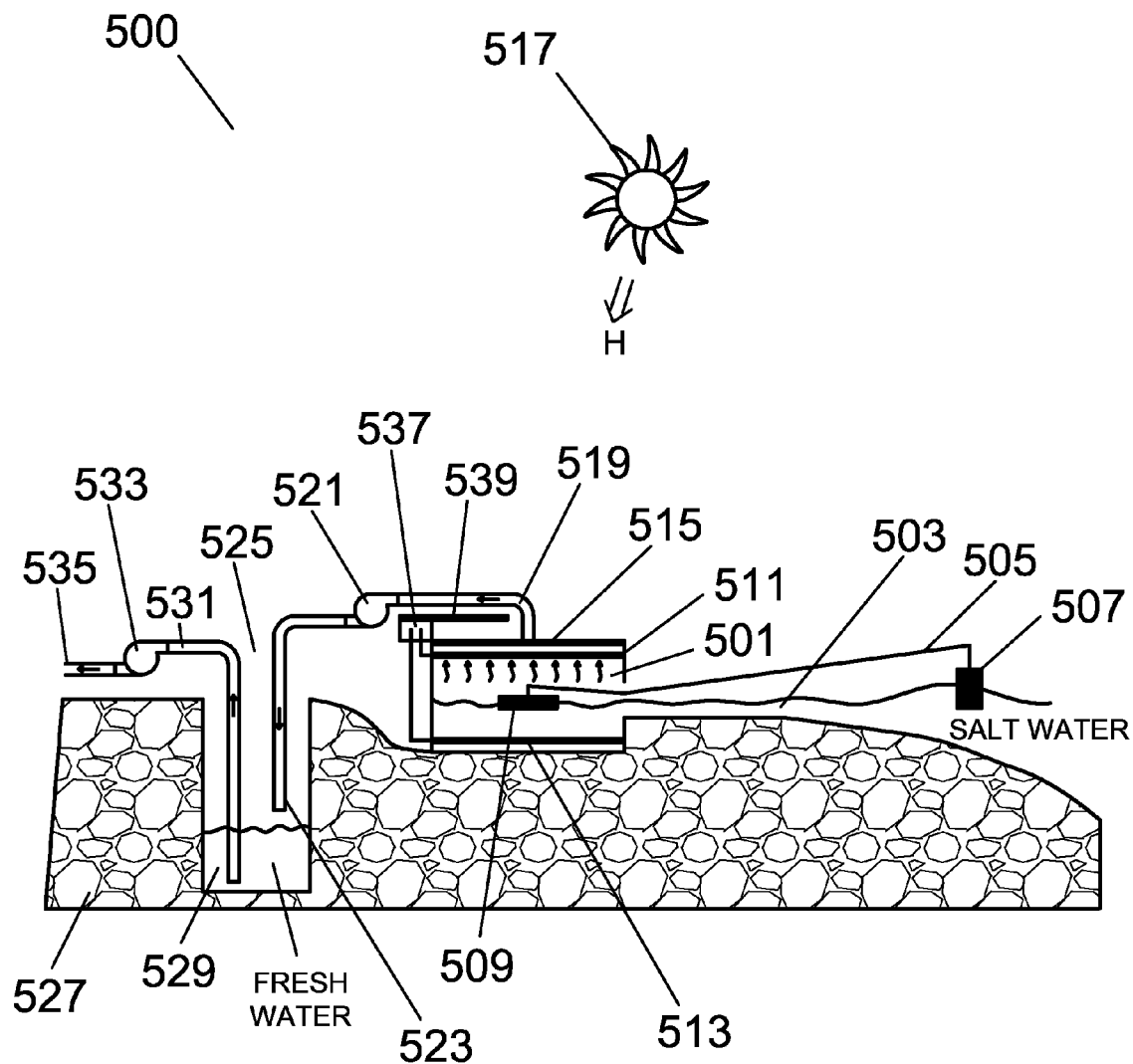
FIG. 5 is a sectional view of one embodiment of the present invention that uses renewable energy sources.

There also exists a need for a desalination system according to the present invention that uses renewable energy, and is powered by natural sources such as the sun and the action of waves. Such a system has tremendous practical applications, such as providing fresh water to regions of the world that lack adequate supplies of fresh water and do not have the economic wealth needed to install and operate large scale desalination systems. Such a system is depicted in FIG. 5, which is a sectional view of one embodiment of the present invention that uses renewable energy sources. The system depicted in FIG. 5 is preferably located a short distance from the ocean or the sea, as it uses salt water from the ocean or the sea as well as the action of the waves to agitate the salt water during the desalination process of the present invention. The sectional view depicted in FIG. 5 shows a salt water processing chamber 501. The salt water processing chamber may be a concrete, plastic, steel, or similarly lined chamber for the retention of salt water. It is open on one side to allow salt water 503 from a source such as the ocean or a sea to enter. The present invention and its various embodiments described herein rely on agitation, bubbling or similar turbulent conditions in the presence of an electrostatic field. In the embodiment depicted in FIG. 5, a coupler 505 is operatively coupled to a float 507 and an agitator 509. The agitator 509 moves through the action of waves in such as way as to create the necessary turbulence in the salt water contained in the salt water processing chamber 501. The agitator may be made of a material such as a non-corrosive metal, a plastic, or the like. The coupler 505 is a mechanical linkage also made of a non-corrosive metal, plastic, or the like. The float 507 is any buoyant structure such as a Styrofoam or air filled structure or similar. As the float rides up and down in the waves, mechanical energy from the waves is translated into agitation to assist with the desalination process of the present invention. As in the embodiments of the present invention heretofore described, an upper electrode 511 sits above the salt water in the salt water processing chamber 501. A water ground 513 is also provided in the salt water processing chamber. Both the upper electrode 511 and the water ground 513 may be made of any conductive material, and may optionally have a dielectric or anti-corrosive coating. Both the upper electrode 511 and the water ground 513 are connected to a high voltage supply 537 that is capable of delivering several thousand to tens of thousands of volts at low current. The high voltage supply 537 may be powered by a photovoltaic panel 539, or another power source such as wind, battery, generator, or the like. A solar thermal collector 515 may optionally be installed above the salt water processing chamber 501 to increase the temperature of the salt water being processed in the system. A suitable solar thermal collector 515 may be a fresnel lens, a diffraction grating, or the like. The sun 517 thus creates an increase in heat within the system due to the positioning of the solar thermal collector 515. As the salt water 503 is agitated through wave action, bubbles and other turbulence create droplets of fresh water and fresh water vapor that can be removed through a fresh water manifold 519 that is connected to the salt water processing chamber. A blower 521 may optionally be used to facilitate movement of the fresh water droplets and vapor that has electrostatically migrated upward away from the salt water 503 through the action of the applied electric field. A collection chamber 525 for the fresh water receives a fresh water outlet 523 that may be a duct, pipe, or similar structure. The fresh water outlet 523 may optionally have baffles to facilitate droplet and vapor condensation. The collection chamber 525 may be made from a non-corrosive, plated or coated metal, a plastic, concrete, ceramic, or the like. The collection chamber 525 may also, in some embodiments of the present invention, be installed in the earth 527 to take advantage of the cooler temperature of the earth in contrast to ambient air. It is known that as one digs deeper in the earth, ground temperatures often times drop. The use of such geothermal cooling will increase the throughput of the system. Other techniques for cooling that are known to those skilled in the art may also be used. As seen in FIG. 5, in use, fresh water 529 will collect in the collection chamber 525. From the collection chamber 525, a fresh water distribution manifold 531 that is placed in the collection chamber 525 will remove the fresh water by way of a pump 533 or similar setup, and connect to a fresh water distribution pipe 535 for distribution and use of the fresh water provided for by the system of the present invention.

Figure 6:
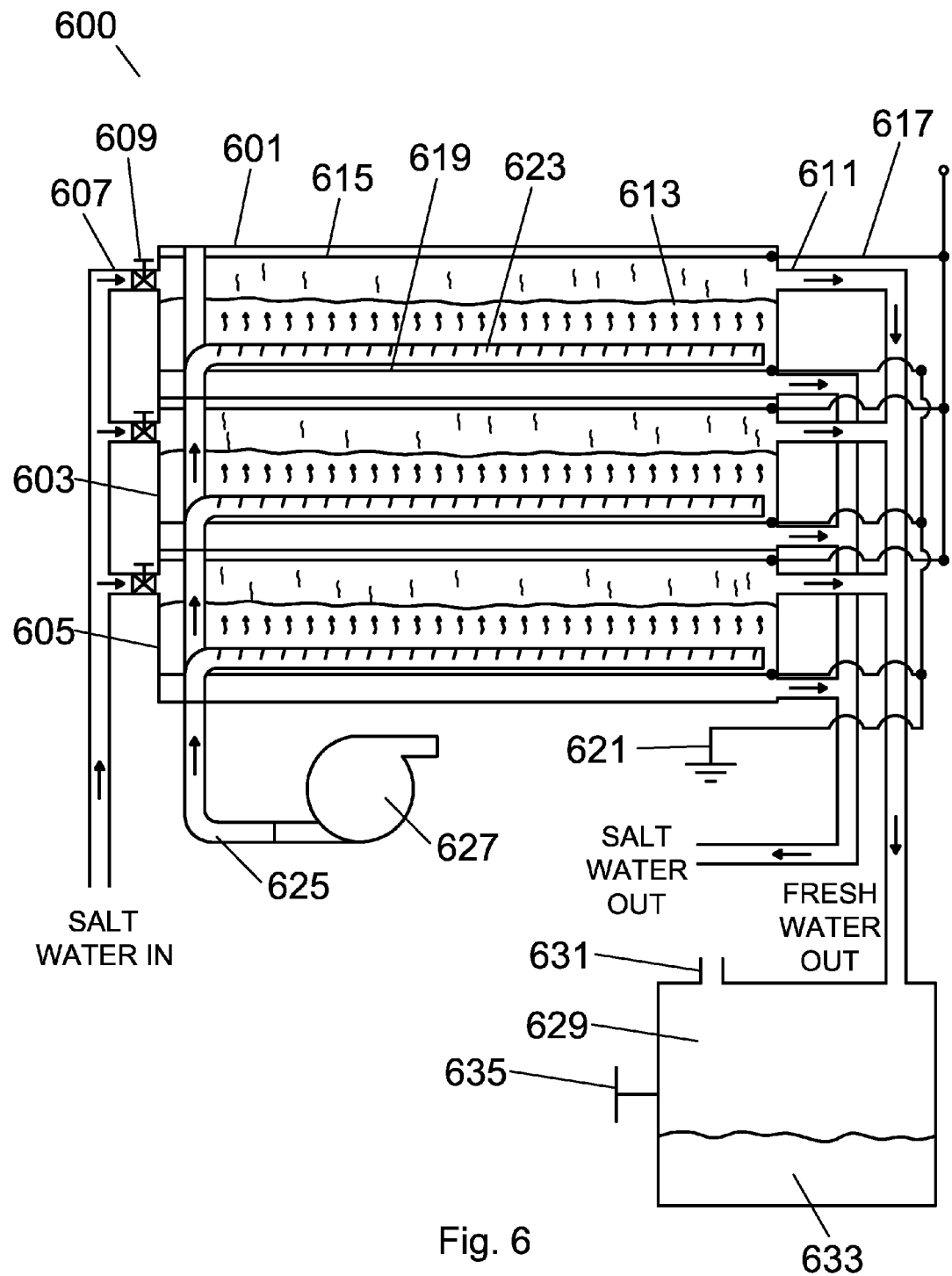
FIG. 6 is a schematic representation of one embodiment of the present invention that is stackable, modular and transportable.

As will be evident after reading this specification and the accompanying drawings, proper aeration, bubbling or agitation of salt water in the presence of an electric field will produce fresh water droplets and vapor that can then be processed for use. Increasing the surface area of the salt water that is being processed is one variable that can increase the production rate of fresh water. Thus, the ability to produce more fresh water while occupying the same footprint is very useful in applications such as mobile desalination systems that are necessary in missions ranging from humanitarian efforts to disaster relief to military operations. What is described by way of FIG. 6 is a stackable system that can be fit to the specific geometries of the required application, such as installation on a truck. FIG. 6 is a schematic representation of one embodiment of the present invention that is stackable, modular and transportable. By way of convenience, and not limitation, FIG. 6 depicts a 3 high stack system. Other quantities and configurations can also be envisioned after reading this specification and the accompanying drawings. The upper stack element will be described; the components for the remaining stack elements depicted in FIG. 6 will be similar. Each stack element is connected to a manifold for delivering salt water into the element, an air manifold for delivering air through the salt water in each stack element, and a fresh water outlet manifold for removing the fresh water produced in each stack element to a tank or other fresh water collection system. The high voltage and associated electronics are also interconnected between the stack elements using buses or similar structures.

The stack element 601, as well as the second stack element 603 and the nth stack element 605 each have the following. A salt water inlet manifold 607 delivers salt water 613 to each of the elements in the stack. A valve 609 may be used in conjunction with other flow control techniques to control the volume and rate of salt water delivery to each stack element. Each stack element may be made from a non-corrosive, plated or coated metal, a plastic or the like. There may be additional hardware used to mechanically couple one stack element to another. A fresh water outlet manifold 611 removes the fresh water droplets and vapor from each stack element into a fresh water tank 629. The fresh water tank may be made from a non-corrosive, plated or coated metal, a plastic or the like, and has an exhaust 631 to allow for air movement. Fresh water 633 is collected in the fresh water tank 629. Optionally, a cooling source 635 may be applied to the fresh water tank 629 to assist in fresh water collection. In each stack element, an upper electrode 615 sits above the salt water 613. The upper electrode 615 may be made from any electrically conductive material, and is connected to a high voltage supply source or bus (not shown) by way of an upper electrode lead 617. A water ground 619 sits in the salt water 613 of each stack element, and is connected to a ground 621. Each stack element also has a bubbler 623 that is coupled to an air manifold 635 that is in turn connected to a blower 627 or similar source of air. The bubbler 623 may be made from a non-corrosive, plated or coated metal, a plastic or the like, and contains perforations or other bubble forming structures. In addition, other techniques for aerating the water, such as electrostatic devices, piezoelectric motors and drives, and the like, may also be used. In use, the stack will be fed salt water so that each stack element is partially full of salt water, the bubbler begins to generate a stream of bubbles in the salt water, and a high voltage potential is applied to electrostatically assist with the removal and subsequent collection of fresh water droplets and vapor. The fresh water is removed from the system by way of positive air pressure and optionally with the assistance of a blower or the like (not shown), and collected for use. Salt water is periodically removed from the system to ensure proper production of fresh water.

Figure 7:
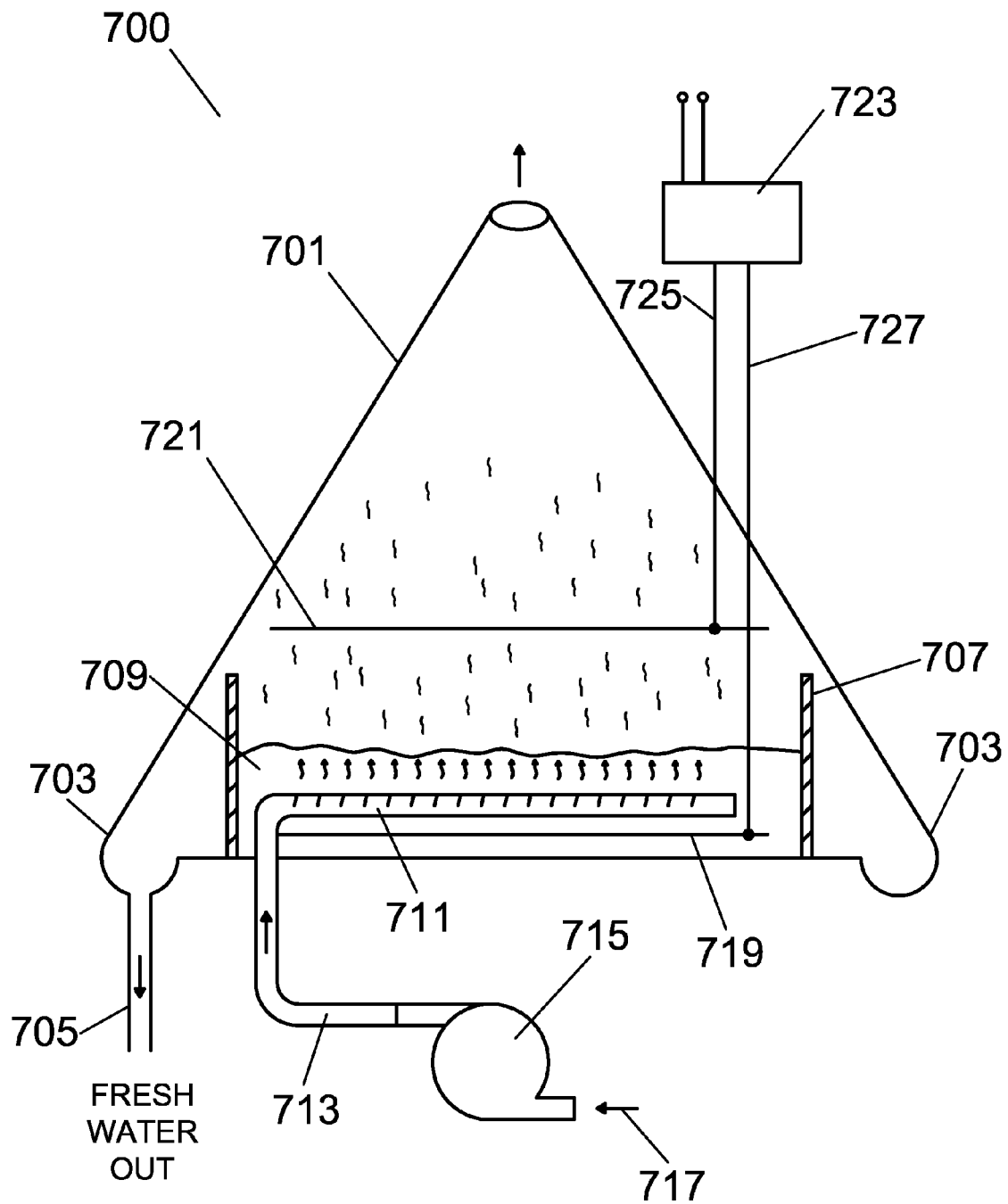
FIG. 7 is a sectional view of one embodiment of the present invention that is portable.

In another embodiment of the present invention as depicted by FIG. 7, a portable system is depicted. The need to create fresh water from salt water extends from very large commercial needs to smaller community, family or group needs, as well as individual needs. Survival, hiking, military, and humanitarian applications all have need for a small, compact and portable desalination apparatus. In FIG. 7, such an apparatus is depicted. Alterations, modifications and improvements to the basic design depicted in FIG. 7 will be suggested to one after reading this specification and the attached drawings, and are considered within the spirit and broad scope of this invention and the various embodiments thereof.

The chamber 701 in FIG. 7 may be of any suitable geometry to collect electrostatically assisted water droplets and vapor, and may be made from any suitable material such as a plastic, a metal, ceramic, and the like. A fresh water collection gutter 703 is used to capture the fresh water as it collects on the sides and walls of the chamber 701. A fresh water outlet 705 will then carry the produced fresh water into a suitable collection vessel or the like. Within the chamber 701 is a salt water vessel 707 where one places salt water 709 prior to beginning the desalination process of the present invention. As described in other embodiments of the present invention, a bubbler 711 is located in the salt water vessel and is operatively coupled by way of an air manifold 713 to a blower 715 or other source of air. The blower 715 has an air inlet 717 where air is carried through the bubbler 711 by way of the blower 715 to produce the bubbles and agitation required for the desalination process of the present invention. In addition, other techniques for aerating the water, such as electrostatic devices, piezoelectric motors and drives, and the like, may also be used. In the salt water vessel 707, a water ground 719 is also seen. The water ground 719 is made from an electrically conductive material, and is electrically connected by way of the ground lead 727 to a high voltage supply 723 such as, for example, the high voltage supplies made by Emco High Voltage. An upper electrode 721 is placed above the salt water 709. and may be made from a conductive material that is non-corrosive, or is coated or plated. The upper electrode 721 is electrically connected by way of the upper electrode lead 725 to the high voltage supply 723. To use the portable system of the present invention depicted in FIG. 7, salt water 709 is added to the salt water vessel 707. The blower 715 is powered on, and the high voltage supply 723 is turned on. As bubbles travel through the salt water 709, they break on the surface of the salt water, releasing fresh water droplets and vapor that are carried up by the electric field applied by way of the upper electrode 721. The fresh water droplets and vapor collect on the sides and walls of the chamber 701, where they run down the sides and walls and are retained by a fresh water collection gutter 703, and finally transferred by way of a fresh water outlet 705 to a suitable storage or collection vessel.

Figure 8:
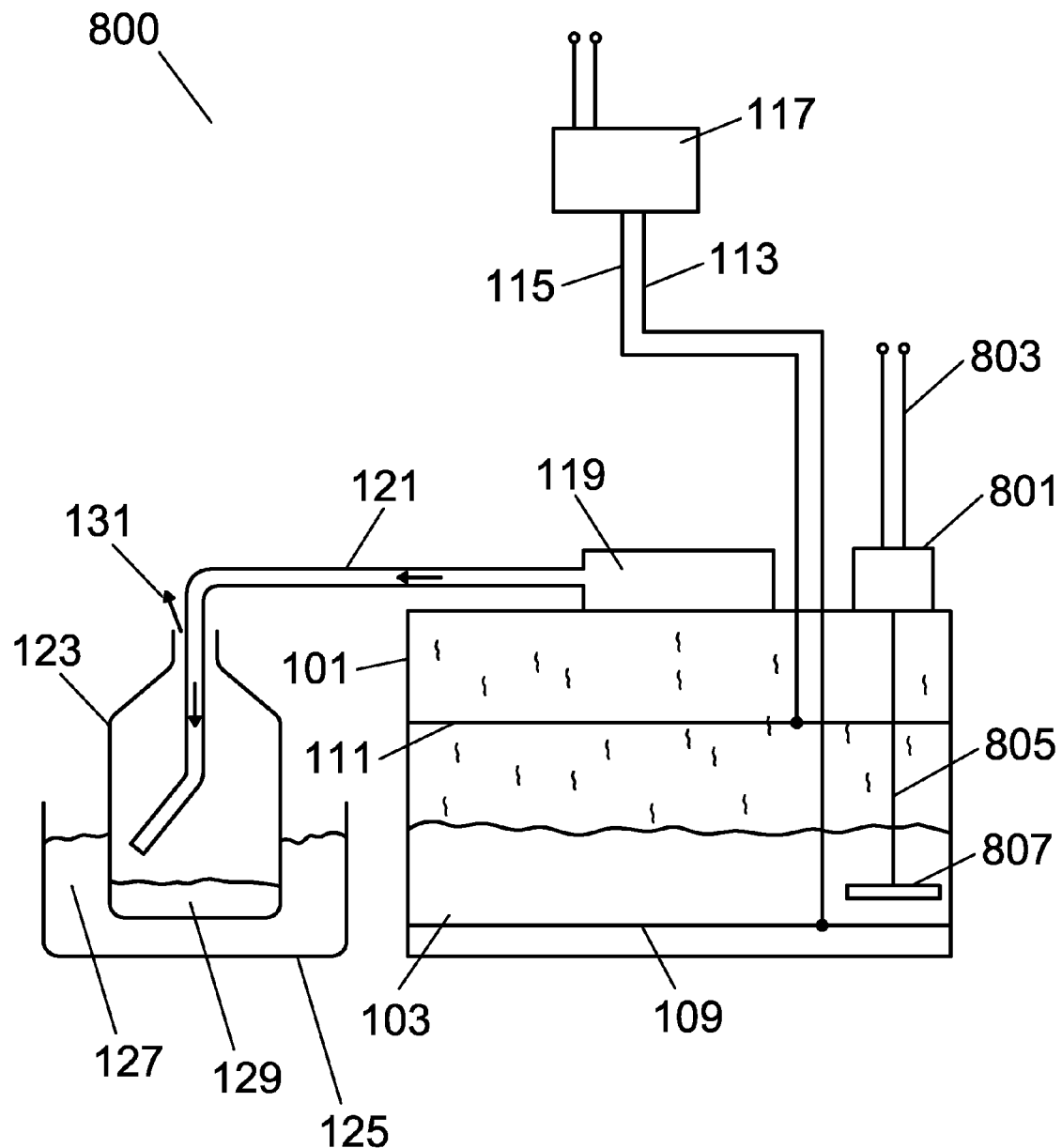
FIG. 8 is a diagram of another embodiment of the present invention.

FIG. 8 depicts a diagram of another embodiment of the present invention. The embodiment depicted in FIG. 8 was built and tested, and the results are provided herein.

A salt water reservoir 101 is depicted. In the experimental setup, a ten gallon glass aquarium was used, but in practice, any suitable vessel for holding salt water and the associated bubbler and upper electrode assembly will do. The salt water 103 is added to the salt water reservoir 101 to a level at which the salt water vessel is partially filled. In the case of the experimental setup, the salt water used was pacific ocean salt water purchased from Petco. Other natural salt water or brackish water would work with equally satisfactory results. Within the salt water reservoir 101 is an impeller 807. The impeller 807 is connected to a motor 801 by way of a shaft 805. The motor 801 is connected to a source of power 803. The motor may, in some embodiments of the present invention, be an electric motor that is connected to a source of electric power. The motor 801 may also be a pneumatic motor or a mechanical motor connected to a source of mechanical power such as a windmill, wind turbine, or the like. The experimental setup used an impeller made from a PVC pipe cut longitudinally and connected to a fiberglass shaft in a perpendicular manner. Other impellers may be used including, for example, a paddle wheel structure as well as others. It was noted that the impeller both agitated the water and drew bubbles into the salt water. It was further noted that the combination of aeration and disturbance of the water and bubbles in the water contributed to production of fresh water from salt water. In the salt water 103, a water ground 109 is present. The ground 109 may be any conductive material. By way of example, the experimental setup used ½ inch stainless steel grid cloth as provided by McNichols Corporation. The ground 109 is connected to a high voltage power supply 117 such as the one used in the experimental setup manufactured by Emco High Voltage, Inc. The connection is made by a ground lead 113 that may be any suitable conductor such as 18 gauge insulated copper wire. Sitting above the salt water 103 is an upper electrode 111 that is connected to the high voltage power supply 117 by way of an upper electrode lead 115. The upper electrode lead may be, for example, 18 gauge insulated copper wire. The insulation is preferably of the kind made for high voltage applications and contains, for example, silicone. The upper electrode 111 may be made from any suitable metallic structure. By way of example, the experimental setup used ½ inch stainless steel grid cloth as provided by McNichols Corporation. The salt water reservoir 101 in one embodiment is covered with a blower 119 to extract and remove fresh water droplets from the reservoir 101. The blower 119 is attached to a fresh water outlet 121 that enters a condensing vessel 123. The condensing vessel in the experimental setup, by way of example, was a 5 gallon glass carboy. The condensing vessel 123 is cooled using any suitable technique for reducing the temperature of a structure. In the experimental setup, a cooling vessel 125 which was a plastic tub containing a coolant 127, in this case snow, was used. Other techniques, such as coolant liquid, cooling airflow, condenser technologies, or the like, may also be used. Fresh water 129 is thus collected in the condensing vessel 123. Exhaust air 131 exits the system during operation.

It should be noted that in place of a condensing vessel 123 and related structures, an electrostatic device such as the Apparatus For Extracting Water Vapor From Air that is disclosed in U.S. Pat. No. 6,302,944 to Hoenig, may be used to collect the fresh water.

To use the embodiment of the present invention depicted in FIG. 1, salt water 103 is placed in the salt water reservoir 101. Care should be taken not to splash the salt water on the sides of the salt water reservoir 101. The high voltage supply 117 is turned on, and the blower 107 is turned on. As the impeller 807 agitates the fresh water and pulls air into the salt water in the form of bubbles, fresh water droplets are produced. The fresh water droplets then encounter the electric field as provided by the upper electrode 111, and are pulled upward and through the upper electrode 111, where they encounter outward air movement provided by the blower 119. The fresh water droplets are then conveyed through a fresh water outlet 121 and into a condensing vessel 123 where they condense and coalesce into fresh water.

In a series of experiments performed at the Lennox Tech Center, Rochester, N.Y., the experimental setup previously described was operated for 40 minutes. The applied voltage was −5,000 volts. The total dissolved solids in parts per million as well as the pH were measured using an Omega Instruments pH/Conductivity meter. The sea water was Pacific Ocean sea water purchased from Petco. In the first experimental run, the sea water was at 29,400 ppm with a pH of 8.2. After 40 minutes, 7 ml. of fresh water was produced with 140 ppm. of total dissolved solids. There was 2 inches of salt water in the reservoir with an electrode spacing of 8 inches. In a comparison experiment, the salt water was not agitated with an impeller, but was agitated by pumping salt water through the bubbler of FIG. 1 (no air) to create agitation in the reservoir without bubbles or air present. The experimental setup was run for 40 minutes at −5,000 volts, and no fresh water was produced. Thus, turbulence appears to enhance the desalination process in the presence of bubbles or gas entrapment. Applicants invention and the various embodiments described and envisioned herein include any technique for entrapment of gas in salt water as well as any technique to create turbulence, and any combination thereof. Spraying of salt water is included in the various techniques of the present invention.

The desalination method of the present invention and its various embodiments described and envisioned herein may also be applied to water that has been polluted or otherwise contains contaminants. In addition, it is expected that commercial distillation systems such as multi-stage flash distillation systems will benefit from the electrostatic techniques described herein, as they are included in the spirit and broad scope of this invention and its various embodiments described herein. Further, the apparatus and method for desalination and water purification described herein does not necessarily rely on filtration, as filtration is intrinsic in the present invention and its various embodiments.

It is, therefore, apparent that there has been provided, in accordance with the various objects of the present invention, an apparatus, system and method for electrostatic desalination and water purification. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the present invention as defined by this specification, drawings and claims.

What is claimed is:

1. A desalination apparatus comprising:
   a non-conductive salt water reservoir for containing salt water;
   a bubbler for moving a gas through the salt water reservoir;
   an upper electrode connected to a voltage source and suspended above contained salt water;
   an electrode submerged in a lower portion of the non-conductive salt water reservoir; and
   a fresh water outlet.

2. The desalination apparatus of claim 1 wherein the gas is air.

3. The desalination apparatus of claim 1 further comprising a solar thermal collector.

4. The desalination apparatus of claim 1 further comprising a second electrode suspended above said upper electrode.

5. The desalination apparatus of claim 1, further comprising a condenser.

6. The desalination apparatus of claim 5, wherein the condenser is an electrostatic condenser.

7. A desalination apparatus comprising:
   a non-conductive salt water reservoir for containing salt water;
   an impeller for agitating and moving a gas through contained salt water;
   an upper electrode connected to a voltage source and suspended above contained salt water;
   an electrode submerged in a lower portion of the non-conductive salt water reservoir; and
   a fresh water outlet.

8. The desalination apparatus of claim 7 wherein the gas is air.

9. The desalination apparatus of claim 7 further comprising a solar thermal collector.

10. The desalination apparatus of claim 7 further comprising a second electrode suspended above said upper electrode.

11. The desalination apparatus of claim 7, further comprising a condenser.

12. The desalination apparatus of claim 11, wherein the condenser is an electrostatic condenser.

13. A system for desalination comprising:
    a flow vessel having an inlet and an outlet;
    a bubbler contained within the flow vessel;
    an upper electrode placed within an air space in the flow vessel and connected to a voltage source;
    an electrode placed within a flow of water; and
    a fresh water manifold coupled to the air space.

14. The system for desalination of claim 13 further comprising a condenser.

15. The system for desalination of claim 14, wherein the condenser is an electrostatic condenser.

16. The system for desalination of claim 13 further comprising a solar thermal collector.

* * * * *